United States Patent [19]

Hermann et al.

[11] Patent Number: 5,495,575
[45] Date of Patent: Feb. 27, 1996

[54] ARRANGEMENT FOR STORING THE ADDRESS OF AN ON-LINE MONITOR PROCESSOR UNIT

[75] Inventors: Karl Hermann, Eckental; Gerhard Musil; Ferdinand Narjes, both of Munich, all of Germany

[73] Assignee: Siemens Aktiengesellschaft, Munich, Germany

[21] Appl. No.: 74,273

[22] Filed: Jun. 7, 1993

Related U.S. Application Data

[63] Continuation of Ser. No. 496,413, Mar. 20, 1990, abandoned.

[30] Foreign Application Priority Data

Mar. 21, 1989 [DE] Germany ............ 39 09 266.6

[51] Int. Cl.[6] ................................. G06F 15/177
[52] U.S. Cl. ............ 395/200.1; 395/700; 395/800
[58] Field of Search ................ 395/200, 575, 395/800

[56] References Cited

U.S. PATENT DOCUMENTS

| | | | |
|---|---|---|---|
| 4,441,164 | 4/1984 | Pavan et al. | 364/900 |
| 4,700,340 | 10/1987 | Beranek et al. | 370/16 |
| 4,750,136 | 6/1984 | Arpin et al. | 364/200 |
| 4,752,871 | 6/1984 | Sparks et al. | 395/800 |
| 4,755,985 | 7/1988 | Jayapalan et al. | 370/58 |
| 4,788,657 | 11/1988 | Douglas et al. | 364/900 |
| 4,811,287 | 3/1989 | Kupersmith et al. | 365/52 |
| 4,941,201 | 7/1990 | Davis | 455/41 |
| 5,038,320 | 8/1991 | Heath et al. | 364/900 |
| 5,040,111 | 8/1991 | Al-Salameth et al. | 364/200 |
| 5,084,816 | 1/1992 | Boese et al. | 395/575 |
| 5,088,089 | 2/1992 | Gingell et al. | 370/67 |
| 5,089,954 | 2/1992 | Rago | 395/600 |

*Primary Examiner*—William M. Treat
*Attorney, Agent, or Firm*—Hill, Steadman & Simpson

[57] ABSTRACT

An arrangement for storing the address of a processor unit that belongs to a device for on-line monitoring of a message transmission equipment is provided in which processor units are provided with respective storable addresses on the basis of an addressing procedure. In order to avoid a readdressing of all processor units upon a replacement of one processor unit, an $E^2PROM$ in which the address of a processor unit can be stored is arranged outside of the processor unit in an insert that contains the processor unit.

5 Claims, 3 Drawing Sheets

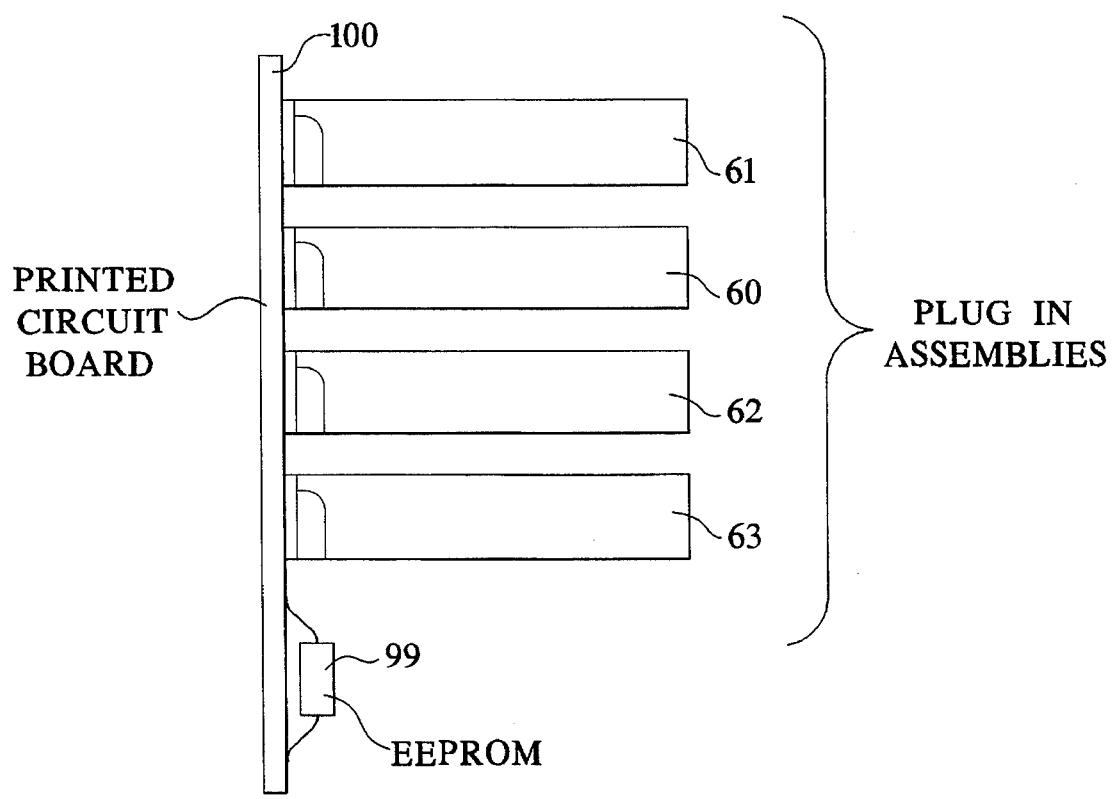

ARRANGEMENT FOR STORING THE ADDRESS OF AN ON-LINE MONITOR PROCESSOR UNIT

This is a continuation of application Ser. No. 07/496,413, filed Mar. 20, 1990, now abandoned.

FIELD OF THE INVENTION

The present invention relates to an on-line monitor processor unit, and more particularly for an arrangement for storing the address of a processor unit that belongs to a device for on-line monitoring of a message transmission equipment, in which a polling unit and processor units provided with addresses exchange information with one another via a message transmission network that query messages of the polling unit and reply messages of the processor units are transmitted and in which the processor units are provided with respective storable addresses during the course of an addressing procedure.

DESCRIPTION OF THE PRIOR ART

An arrangement having such a processor unit has been proposed in an earlier German patent application P 38 06 948.2 having corresponding U.S. application Ser. No. 07/865,759, filed Apr. 10, 1992 and issued Nov. 16, 1993 as U.S. Pat. No. 5,262,771, which is a continuation of application Ser. No. 07/566,379, filed Aug. 27, 1990, now abandoned. The arrangement according to that proposal allows the processor units to be autonomously addressed. In particular, it is thereby possible to autonomously address apparatus comprising processor units for an on-line monitoring of message, preferably digital signal, transmission links.

The arrangement for on-line monitoring operates according to a polling method that allows a central monitoring of digital signal transmission networks having line, branch and star structures and offers the advantages of a self-addressing of the entire network, so that an involved and error-intensive, manual pre-setting of addresses is eliminated.

Processor unit that are connected to one another via a message transmission network are thereby automatically set to different addresses. A respective memory that is contained in the appertaining processor unit serves the purpose of storing the address.

When an assembly that contains a processor unit, or when an insert that contains this assembly is replaced by another, then a re-addressing of all processor units of the device for on-line monitoring can be undertaken with the assistance of the addressing method.

SUMMARY OF THE INVENTION

In the case of a replacement of a processor unit that is already addressed, an object of the invention is to provide the newly-employed processor unit with the address of the replaced processor unit without it being necessary to re-address the entire link.

According to the present invention, the arrangement for achieving the above object is constructed as an arrangement for storing the address of the processor unit that belongs to a device for on-line monitoring of a message transmission equipment, in which a polling unit and processor units provided with address exchange information with one another via a message transmission network such that query messages of the polling unit and reply messages of the processor units are transmitted and in which the processor units are provided with respective storable addresses during the course of an addressing procedure, and in which the arrangement is particularly characterized in that the processor unit is constructed as an assembly and can be plugged into an common insert together with further assemblies, in that the address of the processor unit can be stored in an $E^2PROM$ that is arranged in the insert outside of the processor unit and is electrically connected to the processor unit such that the $E^2PROM$ can be written and read proceeding from the processor unit. The packages with which the processor unit are accommodated together in one and the same insert are thereby, in particular, intermediate regenerators of a digital signal transmission link, line terminal equipment or the like.

A protection of the subscriber address occurs on the basis of the measures of the present invention so that a processor unit newly plugged into the insert advantageously automatically assumes the address of the processor unit previously situated at this location. What is assured in this fashion is that two processor unit or, respectively, monitoring assemblies having the same address are not present in the network.

According to a particular feature of the invention, the arrangement is particularly characterized in that the $E^2$ PROM is arranged on a printed circuitboard that is arranged at the rear of the insert and is rigidly connected thereto.

According to another particular feature of the invention, the arrangement is particularly characterized in that at least one of the further assemblies of the insert contains an $E^2PROM$ in which the address of the processor unit can be stored.

According to another feature of the invention, the arrangement is particularly characterized in that the insert contains a monitoring bus by way of which the processor unit exchanges information with at least one portion of the assemblies, and in that the $E^2PROM$ can be written and read via the bus.

According to another feature of the invention, the arrangement is particularly characterized in that, given insertion of one of the assemblies into the insert that is in operation, the processor unit initiates the storing of its address into the $E^2PROM$ of this assembly.

According to another feature of the invention, the arrangement is particularly characterized in that the processor unit carries out a plausibility check after its initialization and the reading of the address is stored in the insert.

According to another feature of the invention, the arrangement is particularly characterized in that the processor unit, given recognition of given errors of an assembly, respectively erases or inhibits the address stored in the $E^2PROM$ of this assembly.

According to another feature of the invention, the arrangement is particularly characterized in that at least one of the assemblies contains a monitoring device that, given recognition of given errors, erases or inhibits the address stored in the $E^2PROM$ of this assembly.

BRIEF DESCRIPTION OF THE DRAWING

Other objects, features and advantages of the invention, its organization, construction and operation will be best understood from the following detailed description, taken in conjunction with the accompanying drawings, on which:

FIG. 3 illustrates a printed circuit board located at the rear of an insert and carrying an E²PROM as well as several plug-in assemblies.

DESCRIPTION OF THE PREFERRED EMBODIMENT

Figure 1:
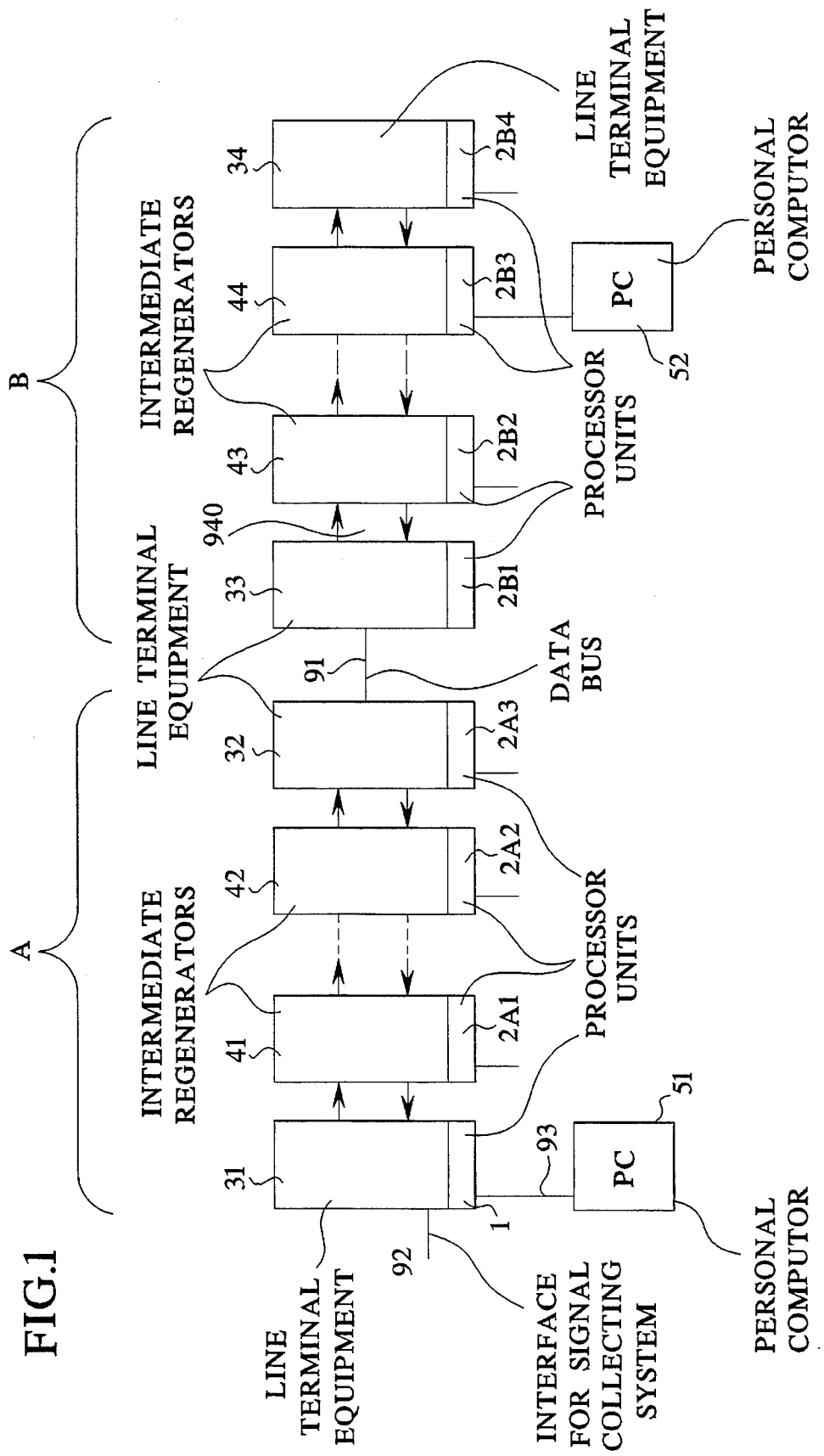
FIG. 1 is a block circuit diagram of a locating section of a device for on-line monitoring.

The location section illustrated in FIG. 1 comprises a message transmission link having two digital signal basic line sections A and B. The line section A extends from a line terminal equipment 31 via a pair of intermediate regenerators (i.e., repeaters) 41 and 42 to a line terminal equipment 32. The line section B comprises a line terminal equipment 33, a line terminal equipment 34 and a pair of intermediate regenerators 43 and 44 arranged therebetween. The broken-line illustration of the four-wire transmission line between the intermediate generators 41 and 42 or, respectively, 43 and 44 expresses that the line sections A and B may potentially contain further intermediate regenerators. Moreover, the line network that is shown can be augmented, in particular, to form a star network.

The operational ability and the transmission properties of the message transmission link can be monitored with a device for on-line monitoring.

To this end, a respective processor unit that can be operated either as a master or as a slave is provided in the line terminal equipment 31–34 and in the intermediate regenerator 41–44. The processor unit 1 in the line terminal equipment 31 is established as a central polling or, respectively, control unit or, respectively, master. The further processor units 2A1–2B4 are each respectively established as a substation or, respectively, a slave and, via a respective internal bus, receive monitoring data from the individual equipment of the message transmission link to be monitored.

The processor unit 1 forms a device for executive sequencing that successively polls the further processor units 2A1–24B with polling messages having their addresses, which receive their monitoring data per reply message and evaluates these data. Instead of the processor unit 1 being established as a master, a locating module can be provided with whose assistance occurring errors can be located.

The processor units are each advantageously controlled by a microprocessor. They have one terminal 94 in the case of line terminal equipment 31–34 and have two terminals 94 in the case of intermediate regenerators 41–44, respectively, one of each of the two directions, for in-coupling and out-coupling into and out of the auxiliary channel 940 superimposed on the useful channel. In addition, they each respectively have a terminal 91 for a bidirectional databus that can be connected to network node.

Within one of the line sections A and B, the monitoring data of the line terminal equipment and of the intermediate regenerators are respectively transmitted from one processor unit to the next processor unit via a telemetry channel 940 that is an auxiliary channel superimposed on the useful signal. In particular, the transmission link belongs to a transmission equipment of the synchronous digital hierarchy. In this case, the line terminal equipment 31–34 are synchronous line multiplexers and the intermediate regenerators 41–44 are synchronous line regenerators. In such a case, the telemetry channel is one of the channels of what is referred to as the overhead that are reserved for a national use.

The connection between the line sections A and B occurs via a bidirectional data bus 91 that connects the terminals of the line terminal equipment 32 and 33 to one another.

A respective personal computer with whose assistance the monitoring data of the entire locating region can be interpreted and portrayed can be connected to the line terminal equipment 31–34 and the intermediate regenerators 41–44, here illustrated as the personal computers PC, further referenced 51 and 52.

A querying of data and the output of control instructions, in combination with a signal collecting system (not shown), is possible via an interface 92 of the line terminal equipment 31 that contains the processor unit 1 established as a master.

The on-line monitoring method operates according to the polling principle. The master cyclically polls the equipment to be monitored, intermediate regenerators and line terminal equipment, with their address by outputting a polling message. Within the cycle, it also polls its own station and, like a slave, subsequently outputs the data of its station. It receives the reply messages sent by the polled equipment, compares the in-coming data to input thresholds and triggers alarms when the thresholds are exceeded.

The assignment of the addresses to the individual equipment ensues to an automatic addressing method. The address assignment of the equipment is hierarchically constructed. One address byte is provided for the addressing of line sections, a further address is provided for the addressing of the processor units within a line section. This type of addressing is expressed in FIG. 1 in that the address composed of a specification of the line section and of a counting number within the line section is attached to the respective reference numeral 2 employed for the processor units.

In accordance with the earlier proposal of the aforementioned German patent application P 38 06 948.2, having corresponding U.S. patent application Ser. No. 07/865,759, filed Apr. 10, 1992, which is a continuation of application Ser. No. 07/566,379, filed Aug. 27, 1990, now abandoned, the addressing of the processor units can be executed such that a processor unit connected to the one of the two ends of the transmission section and serving as an addressing unit during an addressing mode outputs an addressing message containing an address to the transmission section and that the processor units of the transmission section forward the addressing messages and/or a new addressing message after an incrementation of the address contained in the addressing message, and such that the processor unit of the transmission section respectively stores the address of the received or transmitted addressing message as its own address.

Figure 2:
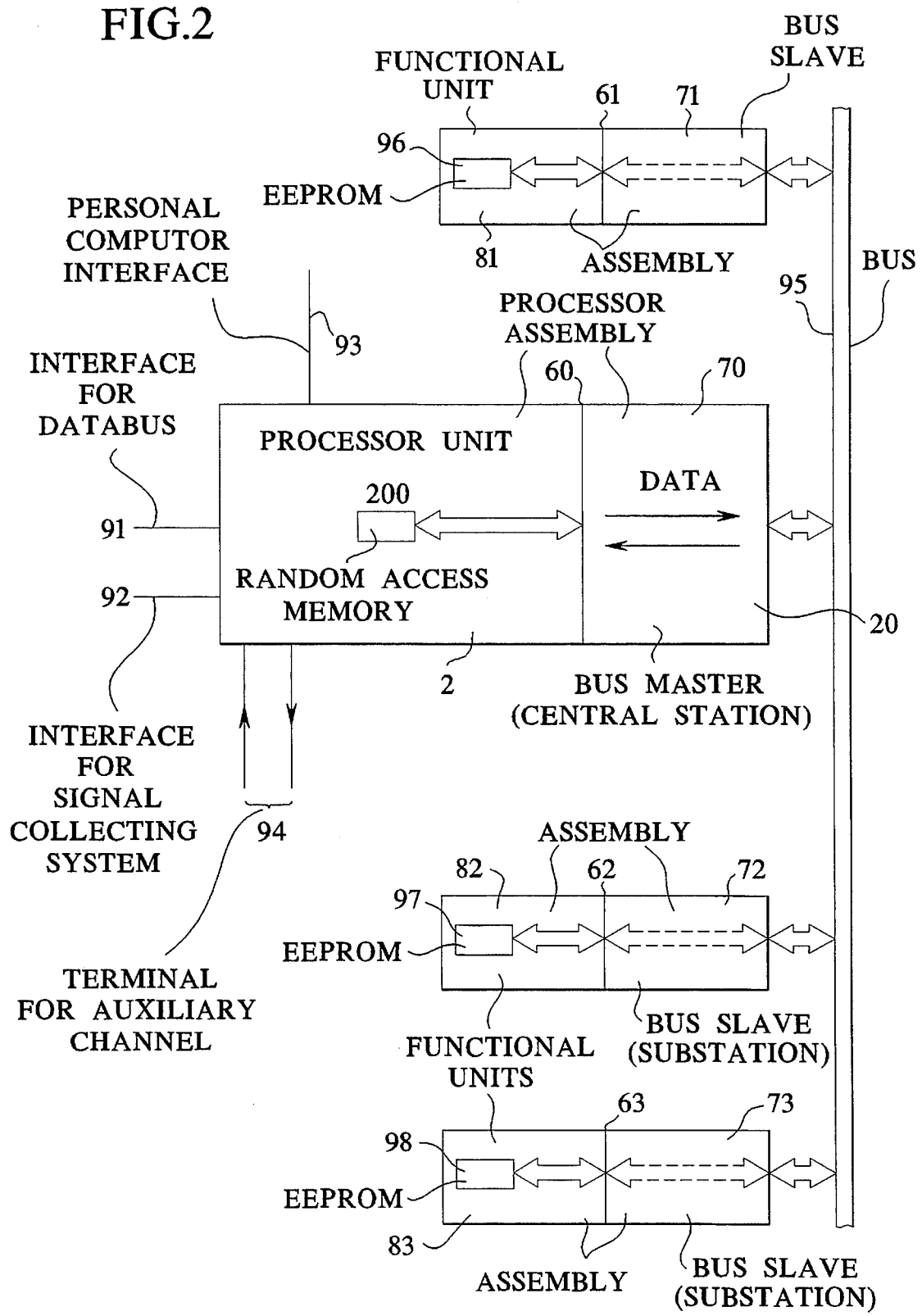
FIG. 2 is a block circuit diagram of an insert composed of a plurality of assemblies and having a monitoring assembly.

FIG. 2 shows a block circuit diagram of an insert 300 in which further assemblies 61, 62 and 63 are accommodated in addition to a processor assembly 60. Together, the assemblies 60–63 correspond to, for example, any of the terminal equipment 31–34 or the repeaters 41–44 of FIG. 1. The assemblies 61–63 contain functional units 81–83 that each respectively provided with one or two E²EPROMs 96–98. The processor assembly 60 and the assemblies, 61, 62 and 63 are connected to one another via a bidirectional bus 95. The information exchange via the bus 95 is controlled via the central station 70 contained in the processor assembly 60 and assigned to the processor unit 2, referred to as bus master. It can be appreciated that the processor assembly 60 corresponds to the processor unit 1, 2A1, 2A2, 2A3, 2B1, 2B2, 2B3 or 2B4, as the case may be. The central station 70 exchanges information with the substations, what are referred to as bus slaves 71, 72 and 73 via the bus 95, the bus slaves being arranged in the assemblies 61, 62 and 63.

The individual assemblies 61–63 contain the E²PROM's 96–98 in order to be able to durably store characterizing data of the assemblies therein such as, for example, manufacture identifiers, assembly designations or settings.

The assemblies 61–63 are connected to one another by an internal network, particularly by one or more busses. One of these is the internal apparatus bus 95, by way of which the disturbances of the assemblies 61–63 can be queried by the processor unit 2. Apparatus settings are also advantageously undertaken via this bus, these settings being then locally stored in the E$^2$PROM's 96–98.

The address of the processor unit 2 is stored in a random access memory RAM 200 of the processor unit to itself and is additionally stored outside of the processor unit 2 in at least one of the E$^2$ PROMs 96–98. On the other hand, according to FIG. 3 it can thereby prove expedient to arrange the E$^2$PROM 99 on a printed circuitboard 100 that is located in the common insert 300 and at the rear of the insert and is durably connected thereto. It can be appreciated that the circuit board 100 forms part of the common insert 100, as illustrated in FIG. 2.

According to FIG. 2, E$^2$PROMs 96–98 are situated on other assemblies 61–63 of the same insert. The E$^2$PROMs each respectively belong to a replaceable unit that can be easily replaced given a defect.

The assemblies 61–63 are connected to the processor unit 2 such that the E$^2$PROMs of the assemblies 61–63 can be written and read proceeding from the processor unit 2.

When the mentioned internal network, particularly formed by a bus 95 via which the E$^2$PROMs can be centrally written and read, is already present in the insert, then it is advantageous to also distribute the address of the processor unit via the network, so that only a slight added expense is required. This network is generally the bus of the monitor by way of which settings can also be undertaken that are respectively durably stored in the assemblies E$^2$PROMs 96–98.

Added as a further advantage of the storage of the address on the assemblies 61–63 is that, given the replacement of such an assembly, the last place of employment thereof continues to be retained and, therefore, the diagnosis of errors is thus facilitated under given conditions.

When one of the assemblies 61–63 is plugged into an insert that is in operation, then this is recognized by the monitor and a storage of the current address of the processor unit 2 into the E$^2$PROM of the assembly is initiated.

Before the plug-in of a processor unit or before the turn-on of the operating voltage, one or more of the other assemblies 61–63 of the insert can have been replaced. After its initialization and the reading of the addresses from the E$^2$PROMs 96–98 of the assemblies 61–63, the processor unit 2 therefore advantageously carries out a plausibility check. In the most simple case, this is a majority decision.

The reliability of the check can be further enhanced in that, given the presence of different addresses, an appropriate message is sent and a confirmation of the result is required from some other location, for example, via a locally-connected computer or some other operating unit.

When an assembly on which a processor unit address is already stored has been repaired or checked before its reemployment, then this address is advantageously erased during checking or is declared invalid by an additional information that is thereby stepped in. Such an assembly can then no longer contribute to an erroneous result when reading the E$^2$PROMs 96–98.

The same advantage is also achieved when an assembly cannot be pulled until a procedure was previously started wherein the address written in by the processor unit is erased or has been declared invalid.

It is also advantageous when the monitor assembly of the insert or that part of an assembly that is responsible for the monitoring thereof erases the processor unit address stored on the appertaining assembly or declares it invalid given a perceived defect of this assembly that will presumably lead to the replacement thereof.

What is achieved by these measures is that two slaves having the same address are not present in the network.

In the manner set forth, the respective address of the processor unit is stored in the RAM of the processor assembly after the addressing and, in addition, is stored in the additional E$^2$PROM 99 of the insert or in the E$^2$PROM's 96–98 of the other assemblies. After:

the processor assembly was newly plugged into the insert; or its power supply was shut off; or its internal watchdog had responded;

i.e. after the address memory in the RAM 200 was erased, the processor assembly reads the addresses from the additional E$^2$PROM 99 of the insert or from the E$^2$PROM 99 of the remaining assemblies and transfers these, potentially after a plausibility check, into its address memory in the RAM.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a communications network having a polling unit and processor units which communicate with one another such that query messages of the polling unit and reply messages of the processor units are transmitted over the communications network and in which the processor units are provided with respective addresses during the course of an autonomous addressing procedure, the communications network including an on-line monitoring device having a processor unit, the improvement comprising:

said on-line monitoring device processor unit being constructed as a plug-in assembly;

a common insert configured to accept a plurality of plug-in assemblies at the same time, including said on-line monitoring device processor unit, said plug-in assemblies comprising said processor units, each of said processor units having a respective memory associated therewith in which a respective address is stored;

at least one E$^2$PROM being operatively associated with the common insert and the plug-in assemblies such that the E$^2$PROM can be written to and read from via the on-line monitoring device processor unit, said at least one E$^2$PROM also having stored therein all of said respective addresses of said processor units of said common insert so that upon need of address information by a given plug-in assembly, the given plug-in assembly can be provided with the address information from the at least one E$^2$PROM, said E$^2$PROM being positioned on a printed circuit board that is positioned at a rear portion of the common insert and is rigidly connected thereto.

2. In a communications network having a polling unit and processor units which communicate with one another such that query messages of the polling unit and reply messages of the processor units are transmitted over the communications network and in which the processor units are provided with respective addresses during the course of an autonomous addressing procedure, the communications network including an on-line monitoring device having a processor unit, the improvement comprising:

said on-line monitoring device processor unit being constructed as a plug-in assembly;

a common insert configured to accept a plurality of plug-in assemblies at the same time, including said on-line monitoring device processor unit, said plug-in assemblies comprising said processor units, each of said processor units having a respective memory associated therewith in which a respective address is stored;

at least one $E^2PROM$ operatively associated with the common insert and the plug-in assemblies such that the $E^2PROM$ can be written to and read from via the on-line monitoring device processor unit, said at least one $E^2PROM$ also having stored therein all of said respective addresses of said processor units of said common insert so that upon need of address information by a given plug-in assembly, the given plug-in assembly can be provided with the address information from the at least one $E^2PROM$;

at least one further plug-in assembly which contains said $E^2PROM$ in which the address of the on-line monitoring device processor unit can be stored;

the common insert further comprising a monitoring bus by way of which the on-line monitoring device processor unit exchanges information with said at least one further plug-in assembly, said $E^2PROM$ of said further plug-in assembly can be written to and read from via said monitoring bus; and wherein given insertion of said further plug-in assembly into the common insert, the on-line monitoring device processor unit is configured to initiate the storing of its address into said $E^2PROM$ of said further plug-in assembly and to undertake an initialization procedure and a following plausibility check during which the address of the on-line monitoring device processor unit is stored in the $E^2PROM$ of the common insert.

3. In the network of claim 2, wherein:

said further plug-in assembly comprises a monitoring device that, given recognition of specific errors, erases or inhibits use of the address stored in the $E^2PROM$ of said at least one further plug-in assembly.

4. In a communications network having a polling unit and processor units which communicate with one another such that query messages of the polling unit and reply messages of the processor units are transmitted over the communications network and in which the processor units are provided with respective addresses during the course of an addressing procedure, the communications network including an on-line monitoring device having a processor unit, the improvement comprising:

said on-line monitoring device processor unit being constructed as a plug-in assembly;

a common insert configured to accept a plurality of plug-in assemblies at the same time, including said on-line monitoring device processor unit, said common insert further comprising a monitoring bus by way of which the on-line monitoring device processor unit exchanges information with at least one further plug-in assembly having its own $E^2PROM$, said $E^2PROM$ of said further plug-in assembly can be written to and read from via said monitoring bus;

an $E^2PROM$ arranged in the common insert outside of the plug-in assemblies but electrically connected thereto such that the $E^2PROM$ can be written to and read from via the on-line monitoring device processor unit;

wherein the on-line monitoring device processor unit is configured to undertake an initialization procedure and a following plausibility check during which the address of the on-line monitoring device processor unit is stored in the $E^2PROM$ of the common insert;

wherein given insert of said further plug-in assembly into the common insert, the on-line monitoring device processor unit is configured to initiate the storing of the address of the further plug-in assembly into said $E^2PROM$ of said further plug-in assembly; and wherein given recognition of errors in said further plug-in assembly, the on-line monitoring device processor unit respectively erases or inhibits the address stored in the $E^2PROM$ of said further plug-in assembly.

5. In a communications network having a polling unit and processor units which communicate with one another such that query messages of the polling unit and reply messages of the processor units are transmitted over the communications network and in which the processor units are provided with respective addresses during the course of an autonomous addressing procedure, the communications network including an on-line monitoring device having a processor unit, the improvement comprising:

said on-line monitoring device processor unit being constructed as a plug-in assembly;

a common insert configured to accept a plurality of plug-in assemblies at the same time, including said on-line monitoring device processor unit, said plug-in assemblies comprising said processor units, each of said processor units having a respective memory associated therewith in which a respective address is stored; and at least one $E^2PROM$ operatively associated with the common insert and the plug-in assemblies, such that the $E^2PROM$ can be written to and read from via the on-line monitoring device processor unit, said $E^2PROM$ being provided in said common insert outside of said plug-in assemblies, said at least one $E^2PROM$ also having stored therein all of said respective addresses of said processor units of said common insert so that upon need of address information by a given plug-in assembly, the given plug-in assembly can be provided with the address information from the at least one $E^2PROM$.

* * * * *